(12) United States Patent
Manjeshwar et al.

(10) Patent No.: US 8,526,415 B2
(45) Date of Patent: Sep. 3, 2013

(54) METHOD AND SYSTEM FOR PROVIDING ACKNOWLEDGED BROADCAST AND MULTICAST COMMUNICATION

(75) Inventors: Arati Manjeshwar, Chandler, AZ (US); Lakshmi Venkatraman, Mountain View, CA (US); Bhaskar Srinivasan, Menlo Park, CA (US)

(73) Assignee: Robert Bosch GmbH, Stuttgart (DE)

( * ) Notice: Subject to any disclaimer, the term of this patent is extended or adjusted under 35 U.S.C. 154(b) by 1545 days.

(21) Appl. No.: 11/240,401

(22) Filed: Sep. 30, 2005

(65) Prior Publication Data

US 2007/0076739 A1    Apr. 5, 2007

(51) Int. Cl.
*H04J 3/00* (2006.01)

(52) U.S. Cl.
USPC ........... 370/345; 370/432; 370/389; 370/236; 370/293; 370/338; 455/450; 455/452.1; 455/414.1; 455/500; 455/437

(58) Field of Classification Search
USPC ................. 370/345, 445, 473, 334, 337, 347, 370/351, 464, 328, 338, 392, 393, 432, 389, 370/236; 455/436, 439, 450, 552.1, 414.1, 455/500, 519, 437
See application file for complete search history.

(56) References Cited

U.S. PATENT DOCUMENTS

| | | | |
|---|---|---|---|
| 6,505,253 B1 | 1/2003 | Chiu | |
| 7,561,599 B2 * | 7/2009 | Ekl et al. | 370/507 |
| 2003/0022683 A1 * | 1/2003 | Beckmann et al. | 455/518 |
| 2003/0103521 A1 * | 6/2003 | Raphaeli et al. | 370/445 |
| 2004/0131075 A1 * | 7/2004 | Sinnarajah et al. | 370/431 |
| 2006/0104333 A1 * | 5/2006 | Rainbolt et al. | 375/132 |

FOREIGN PATENT DOCUMENTS

WO    WO 02/01803    1/2002

OTHER PUBLICATIONS

European Search Report and Examination for EP 06 02 0060, Date Jan. 29, 2007.
Kwok-Wah Hung et al. 1992, "Staggered Multicast Protocol With Collision-Free Acknowledgment in Multihop Spread Spectrum Packet Radio Networks" Discovering a New World of Communications, Chicago, Jun. 14-18, 1992. Bound together with B0190710, vol. 4. Proceedings of the International Conference on Communications, NY IEEE, US 3(14).

* cited by examiner

*Primary Examiner* — Patrick Edouard
*Assistant Examiner* — Fred Casca
(74) *Attorney, Agent, or Firm* — Kenyon & Kenyon LLP

(57) ABSTRACT

A method and system to acknowledge a multicast message includes informing each node in a network about each multicast group to which it belongs, a relative position in each multicast group to which it belongs, and a group size of each multicast group to which it belongs, transmitting the multicast message, and transmitting, by each node in the multicast group, an acknowledgment in an assigned slot, which is determined by the relative position.

21 Claims, 4 Drawing Sheets

| Multicast Message | Ack1 | Ack2 | Ack3 | Ack4 | Ack5 | Ack6 | Ack7 | Ack8 |

*Slotted acknowledgments for a multicast message*

| Multicast Message | Ack1 | Ack2 | Ack3 | Ack4 | Ack5 | Ack6 | Ack7 | Ack8 |

*Slotted acknowledgments for a multicast message*

Figure 2

Retransmission of multicast message to subset of the group

400

METHOD AND SYSTEM FOR PROVIDING ACKNOWLEDGED BROADCAST AND MULTICAST COMMUNICATION

CROSS REFERENCE TO RELATED APPLICATIONS

This application is related to U.S. Patent Applications entitled "Method and System for Time Synchronization in Communication Networks" (Ser. No. 11/241,298), "Method and System for Providing an Energy Efficient Exchange of Information in Wireless Networks" (Ser. No. 11/239,837), "Method and System for Providing Interference Avoidance and Network Coexistence in Wireless Systems" (Ser. No. 11/240,545), "Method and System for Reliable Data Transmission in Wireless Networks" (Ser. No. 11/239,836), "Method and System to Reduce Delay and/or Energy Consumption in a Multi-Hop Wireless System" (Ser. No. 11/240, 436), "Method and System for Providing a Modified Time Division Multiple Access (TDMA) for Reduced Delay" (Ser. No. 11/241,639), "Method and System for Providing Reliable Communication with Redundancy for Energy Constrained Wireless Systems" (Ser. No. 11/241,300), "System and Method for a Communication Protocol for Wireless Sensor Systems Including Systems with High Priority Asynchronous Message and Low Priority Synchronous Message" (Ser. No. 11/241,296), "Method and System to Reconfigure a Network to Improve Network Lifetime Using Most Reliable Communication Links" (Ser. No. 11/240,434). The disclosure of each of the foregoing related applications is hereby incorporated by reference herein in its entirety.

FIELD OF THE INVENTION

The present invention relates to a method of acknowledging communications, including broadcast and multicast communications.

BACKGROUND INFORMATION

Reliable communication may be essential in wireless networks, as the transmission medium may inherently lossy and susceptible to interference. To ensure reliable communication, the receiver may acknowledge every message that is received so that the sender may attempt to retransmit the messages if the acknowledgement is not received. This method of acknowledged communication may be implemented, for example, via unicast communication between a sender and a receiver.

It may be more efficient to send a single message rather than repeat the same message for every receiver node. Such a message sent from one sender to multiple receivers is sometimes referred to as a multicast message. Multicast message transmission may be achieved by forming multicast groups where every group consists of a subset of the network nodes that may be collectively addressed by a single address. The network nodes may be informed about the groups to which they belong and the respective multicast address. Broadcast, for example, may be considered to be a specific instance of multicast transmission in which the message is sent once to all the network nodes.

In multicast/broadcast communication, the multicast group address is used as the destination address. In order to ensure reliability, the sender may require receipt of acknowledgements from all the intended recipients. Efficient methods for acknowledgements to broadcast and multicast may be required for improved performance and reduced power consumption, especially, for example, in applications where power is scarce.

Several applications may require transmission of a message from one sender to many receivers (multicast or broadcast message). Acknowledged multicast communication may require multiple receivers to send acknowledgements to one receiver, which may result in several collisions and extended time durations to accomplish this.

In many applications a single message may be required to be sent to multiple or all network nodes. For example, in sensor networks, the configuration values for the sensors may be dynamically changed by sending a multicast/broadcast message. In temperature monitoring applications, the threshold value beyond which the sensor nodes report to the base station (BS) may be dynamically configured using multicast messages.

Several applications require transmission of a message from one sender to many receivers (multicast or broadcast message). Acknowledged multicast communication may require multiple receivers to send acknowledgements to one receiver, which may result in several collisions and extended time durations to accomplish this.

SUMMARY OF INVENTION

The present invention provides a method for reliable exchange of multicast messages that may be essentially collision free and may also reduce the total time required to exchange messages. This may be especially useful for power-constrained networks where increased transmission and reception durations may result in increased power consumption.

According to an exemplary embodiment and/or exemplary method of the present invention a multicast/broadcast message is transmitted, and every recipient node transmits its acknowledgement in an assigned time slot. In particular, each recipient node uses the time slot corresponding to its relative position in the multicast group. Acknowledgements are transmitted in separate time slots to ensure collision-free communication from multiple nodes by preventing a hidden terminal problem. Bit masks may be used to send a message to a subset of nodes in the multicast group. This feature may be also used to retransmit a multicast/broadcast message to those nodes whose acknowledgements are not received, possibly due to noise or other sources of interference.

According to an exemplary embodiment and/or exemplary method of the present invention, nodes of communication network are informed about a relative position in one or more multicast groups to which they belong to, and time subsequent to a multicast message is divided into acknowledgement time slots, one for each multicast group member based on their relative position. Hence, the multicast/broadcast message is followed by time slots reserved for acknowledgements, in which the end of broadcast/multicast message marks the start of time slots. In this regard, a message first transmitted by broadcast or multicast to the entire group may be retransmitted to a part of the group whose acknowledgements were not successfully received, which may be performed efficiently by using bit masks. Bit masks may also be used to send a message to a subset of any multicast group.

An exemplary embodiment and/or exemplary method of the present invention is directed to a method of acknowledging a multicast message, which includes informing each node in a network about each multicast group to which it belongs, a relative position in each multicast group to which it belongs, and a group size of each multicast group to which it belongs, transmitting the multicast message, and transmitting, by each node in the multicast group, an acknowledgement in an assigned slot, which is determined by the relative position.

An exemplary embodiment and/or exemplary method of the present invention is directed to a method of acknowledging multicast communication, which includes assigning separate time slots to members of a multicast group, transmitting a multicast message, and transmitting acknowledgements in the separate time slots.

Another exemplary embodiment and/or exemplary method of the present invention is directed to a method of acknowledging multicast communication, in which the separate time slots are assigned by informing each member of the multicast group about their relative position in the multicast group.

Yet another exemplary embodiment and/or exemplary method of the present invention is directed to a method of acknowledging multicast communication, which includes retransmitting the multicast message to members of the multicast group which did not transmit an acknowledgement in their assigned time slot.

Still another exemplary embodiment and/or exemplary method of the present invention is directed to a method of acknowledging multicast communication, which includes transmitting a bit mask in the retransmitted multicast message to indicate intended receipt of the multicast message to a subset of the multicast group.

Yet another exemplary embodiment and/or exemplary method of the present invention is directed to a method of acknowledging multicast communication, in which the multicast message is a broadcast message.

Still another exemplary embodiment and/or exemplary method of the present invention is directed to a method of acknowledging multicast communication, in which the subset of the multicast group includes members of the multicast group from which a proper acknowledgement was not received.

Yet another exemplary embodiment and/or exemplary method of the present invention is directed to a method of acknowledging multicast communication, which includes transmitting an acknowledgement by only those members of the multicast group from which the proper acknowledgement was not received.

An exemplary embodiment and/or exemplary method of the present invention is directed to a communication network, which includes an assigning arrangement to assign separate time slots to members of a multicast group, a transmitter node to transmit a multicast message, and a plurality of transceiver nodes that form a multicast group to receive the multicast message and to transmit an acknowledgement in separate time slots assigned to the receiver nodes.

Another exemplary embodiment and/or exemplary method of the present invention is directed to a communication network, in which the separate time slots are assigned to each member of the multicast group according to their relative position in the multicast group.

Still another exemplary embodiment and/or exemplary method of the present invention is directed to a communication network, in which the transmitter node is configured to retransmit the multicast message to members of the multicast group which did not transmit a proper acknowledgement in their assigned time slot.

Yet another exemplary embodiment and/or exemplary method of the present invention is directed to a communication network, in which the transmitter node is configured to transmit a bit mask in the retransmitted multicast message to indicate intended receipt of the multicast message to a subset of the multicast group.

Still another exemplary embodiment and/or exemplary method of the present invention is directed to a communication network, in which the multicast message is a broadcast message.

Yet another exemplary embodiment and/or exemplary method of the present invention is directed to a communication network, in which the subset of the multicast group includes members of the multicast group from which the proper acknowledgement was not received.

Still another exemplary embodiment and/or exemplary method of the present invention is directed to a communication network, in which the plurality of transceiver nodes are configured to transmit an acknowledgement by only those members of the multicast group from which the proper acknowledgement was not received.

BRIEF DESCRIPTION OF THE DRAWINGS

FIG. 2 shows an exemplary time allocation of a communications channel available to the sender node and the eight receiver nodes of the exemplary communications network of FIG. 1.

DETAILED DESCRIPTION

Figure 1:
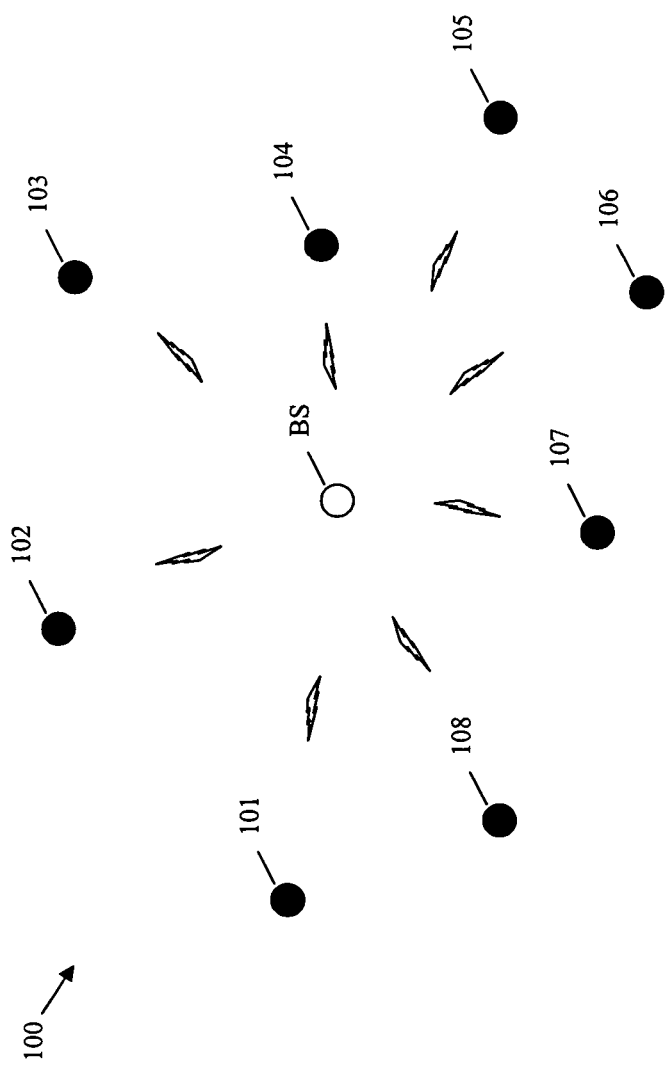
FIG. 1 shows an exemplary communications network, which includes a sender node and eight receiver nodes.

FIG. 1 shows an exemplary communications network 100, which includes a sender node BS and eight receiver nodes 101 to 109. In particular, the exemplary communications network 100 includes a sender node BS, a first receiver node 101, a second receiver node 102, a third receiver node 103, a fourth receiver node 104, a fifth receiver node 105, a sixth receiver node 106, a seventh receiver node 107, and an eighth receiver node 108. In this regard, the exemplary communications network 100 may be, for example, a wireless communications network, in which the sender node BS is a base station and the receiver nodes 101 to 109 are wireless communication devices.

FIG. 2 shows an exemplary time allocation 200 of a communications channel available to the sender node BS and the eight receiver nodes 101 to 108 of the exemplary communications network 100 of FIG. 1. In particular, the exemplary time allocation 200 includes a multicast message followed by time slots Ack1 to Ack8 reserved for acknowledgements. In this regard, the multicast message may be sent, for example, by the sender node BS, and the time slots Ack1 to Ack8 may be reserved for the transmission of acknowledgements to the multicast message by the receiver nodes 101 to 109. More specifically, the time slot Ack1 is reserved for the transmission of an acknowledgement to the multicast message by the first receiver node 101. The time slot Ack2 is reserved for the transmission of an acknowledgement to the multicast message by the second receiver node 102. The time slot Ack3 is reserved for the transmission of an acknowledgement to the multicast message by the third receiver node 103. The time slot Ack4 is reserved for the transmission of an acknowledgement to the multicast message by the fourth receiver node 104. The time slot Ack5 is reserved for the transmission of an acknowledgement to the multicast message by the fifth receiver node 105. The time slot Ack6 is reserved for the transmission of an acknowledgement to the multicast message by the sixth receiver node 106. The time slot Ack7 is reserved for the transmission of an acknowledgement to the multicast message by the seventh receiver node 107. Finally, the time slot Ack8 is reserved for the transmission of an acknowledgement to the multicast message by the eighth receiver node 101.

Figure 3:
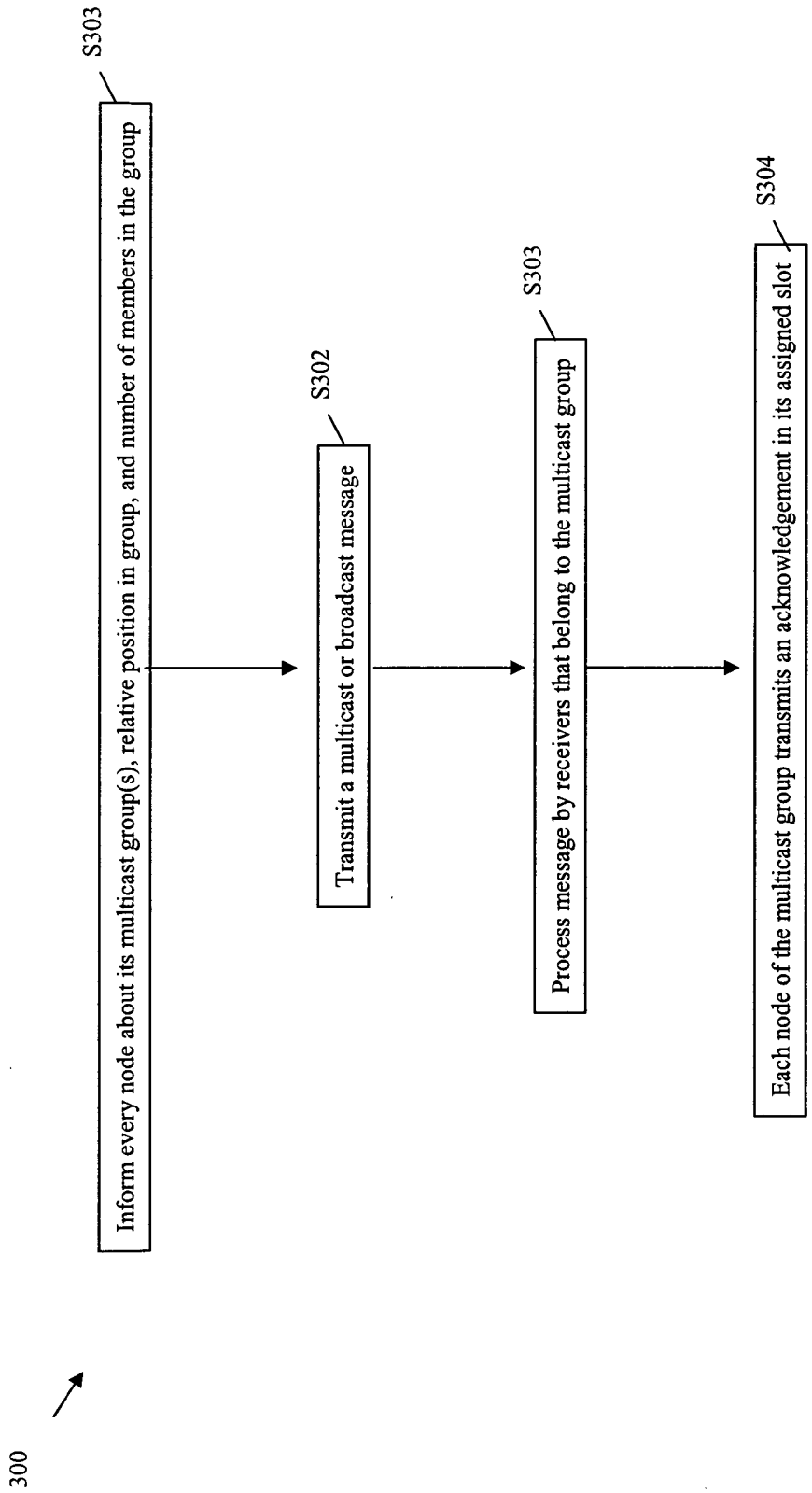
FIG. 3 shows an exemplary method for acknowledging communication between the sender node and the plurality of receivers nodes of the exemplary communications network of FIG. 1.

FIG. 3 shows an exemplary method 300 for acknowledging communication between the sender node BS and the plurality of receivers nodes 101-109 of the exemplary communications network 100 of FIG. 1. The exemplary method 300 assumes that all the receiver nodes 101 to 108 are at a "one hop" distance from the sender node BS and therefore can directly send their acknowledgements without any aggregation. It is also assumed that a bidirectional path exists from the sender node BS to every receiver nodes 101-109. Moreover, it is understood that the receiver nodes 101-109 may be, for example, part of a transceiver nodes capable of both transmitting and receiving. During the setup of the network, the sender node BS and the receiver nodes 101-109 are informed about the multicast addresses and membership. The communication links are assumed to be error prone, which may result in packet losses.

In step S301, during network initialization, every node is informed about the multicast group it belongs to, its relative position in each multicast group and the number of members in the group. A node may belong to more than one multicast group. In step S302, the sender node BS transmits a multicast or broadcast message to the receiver nodes 101-109. In step S303, the receiver nodes 101-109 process the packet if they belong to the group address specified in the packet. (e.g., each receiver node checks the multicast address). All the members of the group may receive this message at the same instant (or essentially the same instant). The time following the end of the multicast or broadcast message is divided into slots, with one slot reserved for each intended receiver. See FIG. 2. The length of each time slot is equal to the time duration required to transmit an acknowledgement packet. In step S304, each receiver node 101-109 transmits its acknowledgement in its assigned slot so that each receiver node uses the slot corresponding to its relative position in the multicast group.

Transmission of acknowledgements in separate time slots may ensure collision-free communication from multiple nodes by preventing the "hidden terminal" problem.

The time required for this entire communication is equal to (duration for the multicast message)+(time for acknowledgement*number of nodes in the multicast group)

The multicast packet may also be sent to only a subset of the nodes in the multicast group. This may be used, for example, to retransmit the message to those nodes whose acknowledgements are not received, possibly due to noise or other sources of interference. This may also be used to send messages to a subset of the nodes in a multicast group.

If the sender node does not receive acknowledgements from more than one receiver node, it may multicast the same message with a bit mask to specify the receivers it expects an acknowledgement from. Using a bit mask instead of long node addresses may help to specify the list of intended recipients more concisely. For example in FIG. 1, a multicast group has 8 intended receiver nodes, which acknowledge one after the other following the receipt of the multicast message. If, for example, acknowledgements from nodes in positions 2 and 4 were not received, the sender retransmits the packet after all acknowledgement slots are finished. The bit mask may look like, for example, "00001010" where zeros indicate that receivers with the specific addresses need not acknowledge. Nodes in positions 2 and 4 send their acknowledgement, in the order of the bit position in the bit mask, i.e. node 2 followed by node 4. This also indicates to the other nodes that their acknowledgements were received successfully. In low power systems like sensor networks, this may be an indicator for the other nodes that they may go to sleep.

In order to use bit masks, the number of nodes in each multicast group may be sent to the nodes during initialization, or if the payload has a fixed length, the length of the packet including the bit mask may be an indicator of the size of the bit mask. For example, if the payload is 15 bytes, and packet length is 17 bytes, the size of the bit mask is 2 bytes.

Figure 4:
FIG. 4 shows an exemplary time allocation of a communications channel for retransmission of a multicast message by the sender node to a subset of the receiver nodes, which did not respond with an acknowledgement to the multicast message or from which the sender node did not receive a proper acknowledgement.

FIG. 4 shows an exemplary time allocation 400 of a communications channel for retransmission of the multicast message by the sender node BS to a subset of the receiver nodes 101-109, which did not respond with an acknowledgement to the multicast message or from which the sender node BS did not receive a proper acknowledgement. In particular, the exemplary time allocation 400 includes a tone and bit mask indicating that a proper acknowledgment to the previously sent multicast message was not received from the fifth receiver node 105 or the seventh receiver node 107. In this regard, the fifth receiver node 105 and the seventh receiver node 107 may have failed to respond with a proper acknowledgement to the previously sent multicast message, or the sender node BS may have not detected a proper acknowledgement from the fifth receiver node 105 and the seventh receiver node 107. The tone and bit mask indicating that a proper acknowledgement to the previously sent multicast message was not received from the fifth receiver node 105 and the seventh receiver node 107 is followed by time slots Ack5 and Ack7 reserved for acknowledgements from the fifth receiver node 105 and the seventh receiver node 107. Accordingly, the fifth receiver node 105 and the seventh receiver node 107 are provided with an additional opportunity to acknowledge the multicast message without requiring additional communication by the other receiver nodes, from which a proper acknowledgement to the previously multicast message was received. That is, the first receiver node 101, the second receiver node 102, the third receiver node 103, the fourth receiver node 104, the sixth receiver node 106, and the seventh receiver node 107 are not required to expend additional resources while the sender node BS attempts again to receive acknowledgements from the fifth receiver node 105 and the seventh receiver node 107.

According to an exemplary embodiment and/or exemplary method of the present invention, if the sender does not receive an acknowledgement from a single receiver, it may unicast the same packet to that receiver. For example, if the sender node BS receives an acknowledgement from receiver nodes 101 to 107 but does not receive an acknowledgement from eighth receiver node 108 then the sender node BS may simply unicast the same packet to the eighth receiver node 108 without sending the packet to the receiver nodes 101 to 107.

What is claimed is:

1. A method of acknowledging a multicast message, comprising:
informing each node in a network of an identification of each multicast group to which it belongs, a relative position in each multicast group to which it belongs, and a group size of each multicast group to which it belongs;
transmitting the multicast message; and
transmitting, by each node in the multicast group, an acknowledgment in an assigned time slot, which is determined by the relative position, each time slot having a predefined time length and being equal to a time duration sufficient for at least one transmission of an acknowledgement;

wherein a time required for the entirety of the multicast message and the acknowledgement transmitted by each node is equal to at least the predefined time length multiplied by a number of nodes in the multicast group plus a time duration of the multicast message.

2. The method of claim 1, wherein following the transmitting of the multicast message, a time period is divided into slots, each separate one of the slots being reserved for a respective node.

3. The method of claim 1, wherein the informing is performed during network initialization.

4. The method of claim 1, wherein at least one node belongs to more than one multicast group.

5. A method of acknowledging multicast communication, comprising:

assigning separate time slots to members of a multicast group by informing each member of the multicast group about its respective position in the multicast group;

transmitting a multicast message; and transmitting acknowledgements in the separate time slots, each time slot including a predefined time length and being equal to a time duration sufficient for at least one transmission of an acknowledgement;

wherein a time required for the entirety of the multicast communication and the acknowledgements is equal to at least the predefined time length multiplied by a number of members in the multicast group plus a time duration of the multicast communication.

6. The method of claim 5, wherein the multicast message is a broadcast message.

7. The method of claim 5, further comprising:

retransmitting the multicast message to members of the multicast group which did not transmit an acknowledgement in their assigned time slot.

8. The method of claim 7, wherein the multicast message is not retransmitted to members of the multicast group which did transmit an acknowledgement in their assigned time slot.

9. The method of claim 7, wherein the multicast message is retransmitted after complete passage of all of the acknowledgement time slots of all the members of the multicast group.

10. The method of claim 7, further comprising:

transmitting a bit mask in the retransmitted multicast message to indicate intended receipt of the multicast message to a subset of the multicast group.

11. The method of claim 10, wherein the subset of the multicast group includes members of the multicast group from which a proper acknowledgement was not received.

12. The method of claim 11, further comprising:

transmitting an acknowledgement by only those members of the multicast group from which the proper acknowledgement was not received.

13. The method of claim 12, wherein the acknowledgements are transmitted in the order of the relative positions of the members in the multicast group.

14. A communication network, comprising:

an assigning arrangement to assign separate time slots to members of a multicast group according to their relative position in the multicast group;

a transmitter node to transmit a multicast message; and a plurality of transceiver nodes that form a multicast group to receive the multicast message and to transmit an acknowledgement in separate time slots assigned to the receiver nodes, each time slot having a predefined time length and being equal to a time duration sufficient for at least one transmission of an acknowledgement;

wherein a time required for the entirety of the multicast message and the acknowledgement transmitted by the plurality of transceiver nodes is equal to at least the predefined time length multiplied by a number of transceiver nodes in the multicast group plus a time duration of the multicast message.

15. The communication network of claim 14, wherein the transmitter node is configured to retransmit the multicast message to members of the multicast group which did not transmit a proper acknowledgement in their assigned time slot.

16. The communication network of claim 15, wherein the transmitter node is configured to transmit a bit mask in the retransmitted multicast message to indicate intended receipt of the multicast message to a subset of the multicast group.

17. The communication network of claim 16, wherein the subset of the multicast group includes members of the multicast group from which the proper acknowledgement was not received.

18. The communication network of claim 14, wherein the plurality of transceiver nodes are configured to transmit an acknowledgement by only those members of the multicast group from which the proper acknowledgement was not received.

19. The communication network of claim 14, wherein the multicast message is a broadcast message.

20. A method of acknowledging a multicast message, comprising:

informing each node in a network of an identification of each multicast group to which it belongs, a respectively assigned multicast group address of each multicast group to which it belongs, a relative position in each multicast group to which it belongs, and a group size of each multicast group to which it belongs;

subsequently transmitting the multicast message to the multicast group address of one of the multicast groups; and transmitting, by each node in the multicast group, an acknowledgment in an assigned time slot, each time slot having a predefined time length and being equal to a time duration sufficient for at least one transmission of an acknowledgement, which respective time slot each node in the multicast group determines by the information the node received regarding its relative position in the multicast group;

wherein a time required for the entirety of the multicast message and the acknowledgement transmitted by each node in the multicast group is equal to at least the predefined time length multiplied by a number of nodes in the multicast group plus a time duration of the multicast message.

21. A communication network, comprising:

a plurality of transceiver nodes;

an initializing arrangement adapted to inform each of the nodes of, for each multicast group to which the node belongs:

a respectively assigned multicast group address;

a relative position of the node in the multicast group; and a group size of the multicast group;

an assigning arrangement to assign separate time slots to nodes of each of at least one of the multicast groups according to their relative positions in the multicast group; and a transmitter node to, subsequent to the informing by the initializing unit, transmit a multicast message to the multicast group address of one of the at least one multicast group;

wherein:
the transceiver nodes of the addressed multicast group transmit an acknowledgement in their assigned time slots, each time slot having a predefined time length and being equal to a time duration sufficient for at least one transmission of an acknowledgement, which respective time slot is determined by the transceiver nodes based on the information they received from the initializing arrangement regarding their relative positions in the addressed multicast group; and a time required for the entirety of the multicast message and the acknowledgement transmitted by the transceiver nodes of the addressed multicast group is equal to at least the predefined time length multiplied by a number of transceiver nodes in the addressed multicast group plus a time duration of the multicast message.

\* \* \* \* \*